United States Patent [19]
Milstein et al.

[11] Patent Number: 5,483,443
[45] Date of Patent: Jan. 9, 1996

[54] METHOD FOR COMPUTING CURRENT PROCEDURAL TERMINOLOGY CODES FROM PHYSICIAN GENERATED DOCUMENTATION

[75] Inventors: Bernard A. Milstein; Nancy J. Maguire; Judith H. Meier, all of Galveston, Tex.

[73] Assignee: Promt Medical Systems, Houston, Tex.

[21] Appl. No.: 226,002

[22] Filed: Apr. 8, 1994

[51] Int. Cl.⁶ .................................................. G06F 159/00
[52] U.S. Cl. ............................................................ 364/401
[58] Field of Search ........................ 364/413.01, 413.02, 364/413.03, 401

[56] References Cited

U.S. PATENT DOCUMENTS

| | | | |
|---|---|---|---|
| 4,290,114 | 9/1981 | Sinay | 364/413.02 |
| 4,667,292 | 5/1987 | Mohlenbrock et al. | 364/413.01 |
| 5,018,067 | 5/1991 | Mohlenbrock et al. | 364/413.02 |
| 5,325,293 | 6/1994 | Dorne | 364/413.01 |

*Primary Examiner*—Donald E. McElheny, Jr.
*Attorney, Agent, or Firm*—Bardehle & Partners

[57] ABSTRACT

A process is disclosed for calculating a Current Procedural Terminology ("CPT") code from input received from a physician or other medical professional. The physician is prompted with lists of choices corresponding to a patient's medical status. The physician makes selections from these lists which are then input into a computer. The computer then determines intermediate codes from the physician's selections. After the physician has completed entering selections, the computer then calculates a final CPT code for reimbursement purposes based on the previously calculated intermediate codes.

15 Claims, 11 Drawing Sheets

Microfiche Appendix Included
(9 Microfiche, 822 Pages)

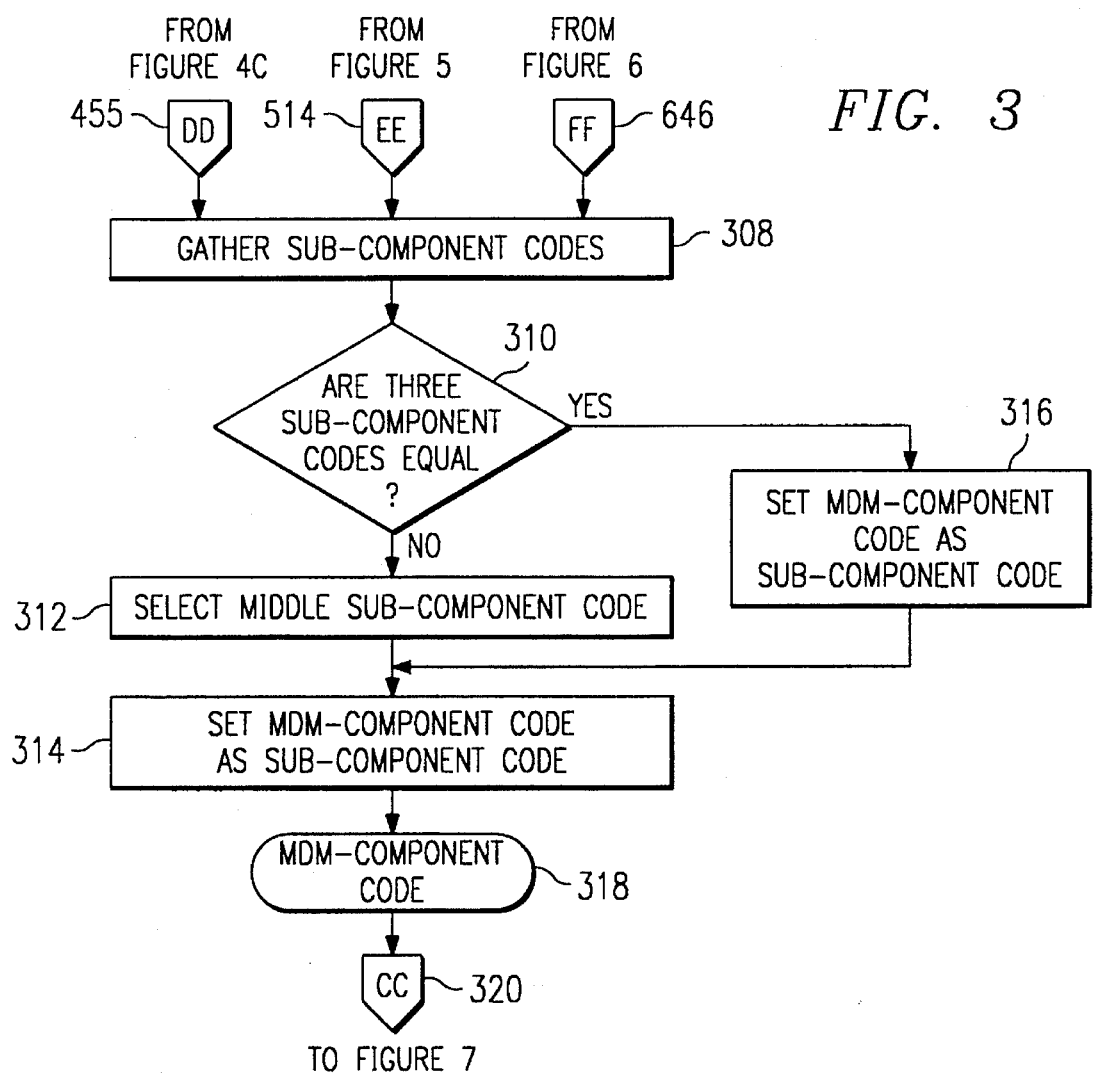

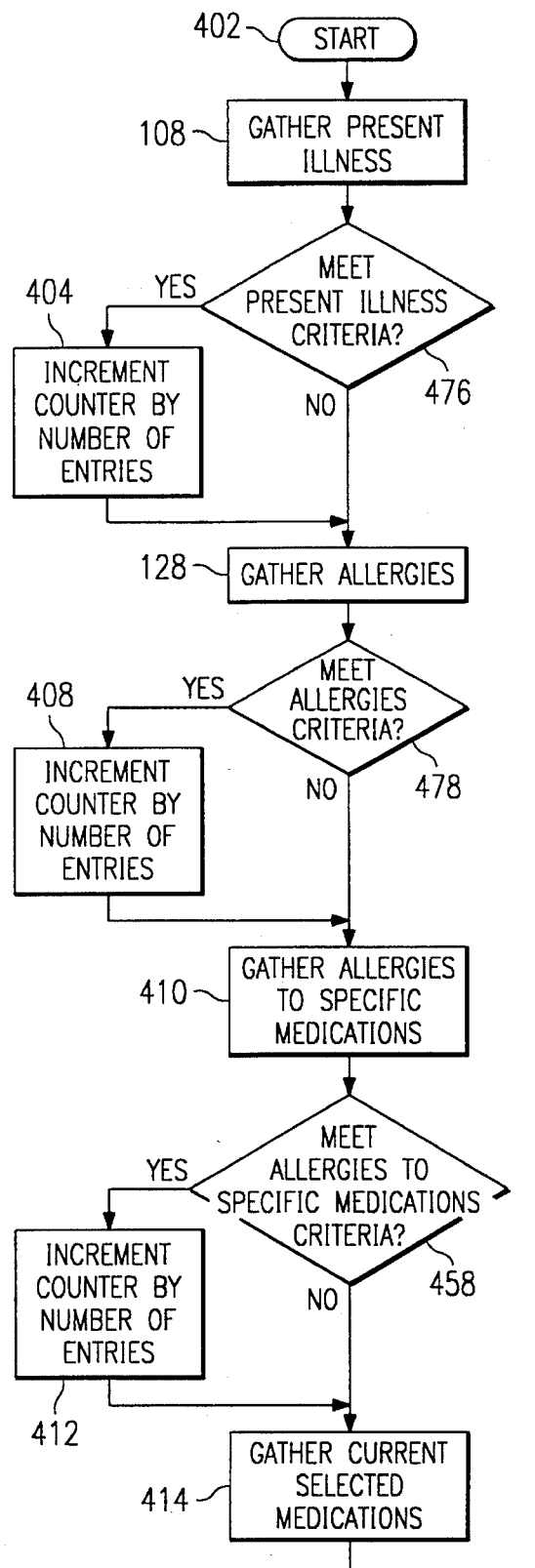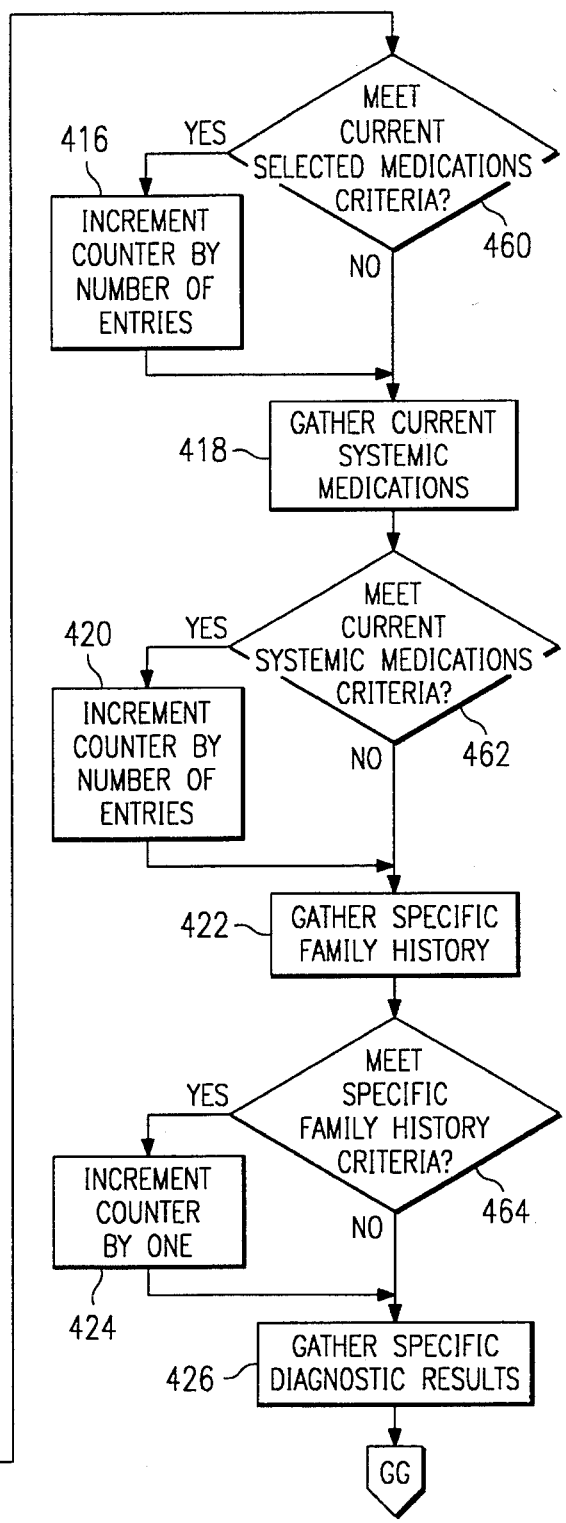
FIG. 4A

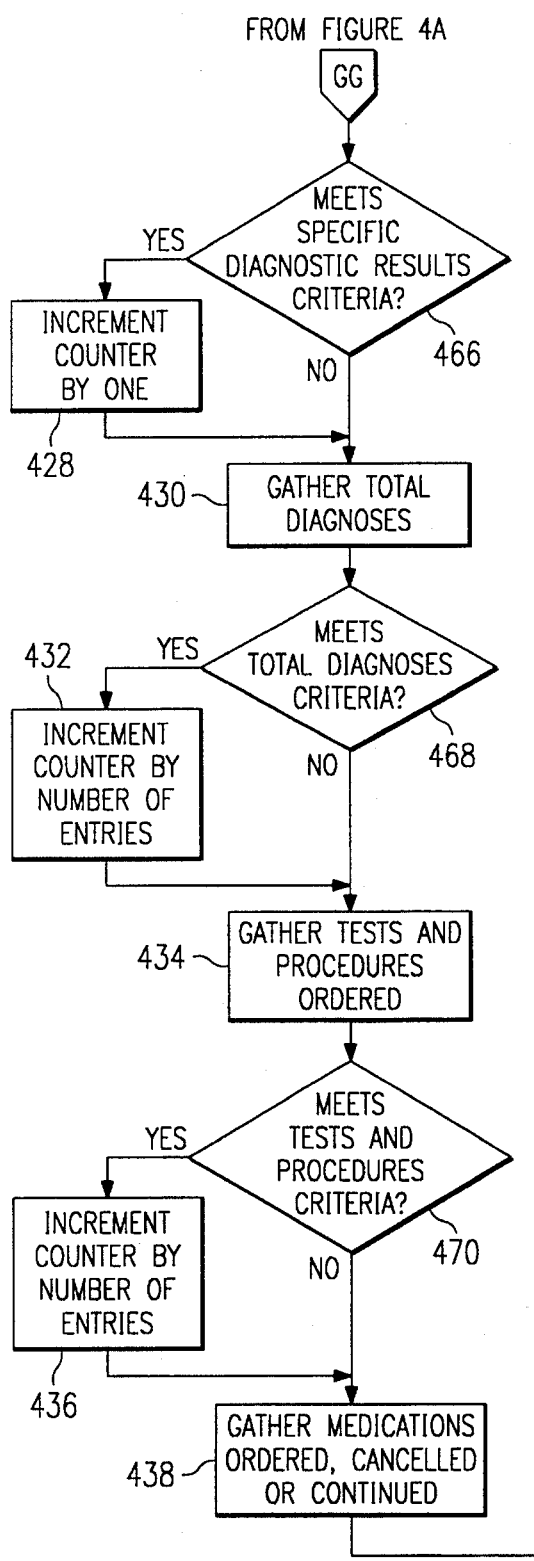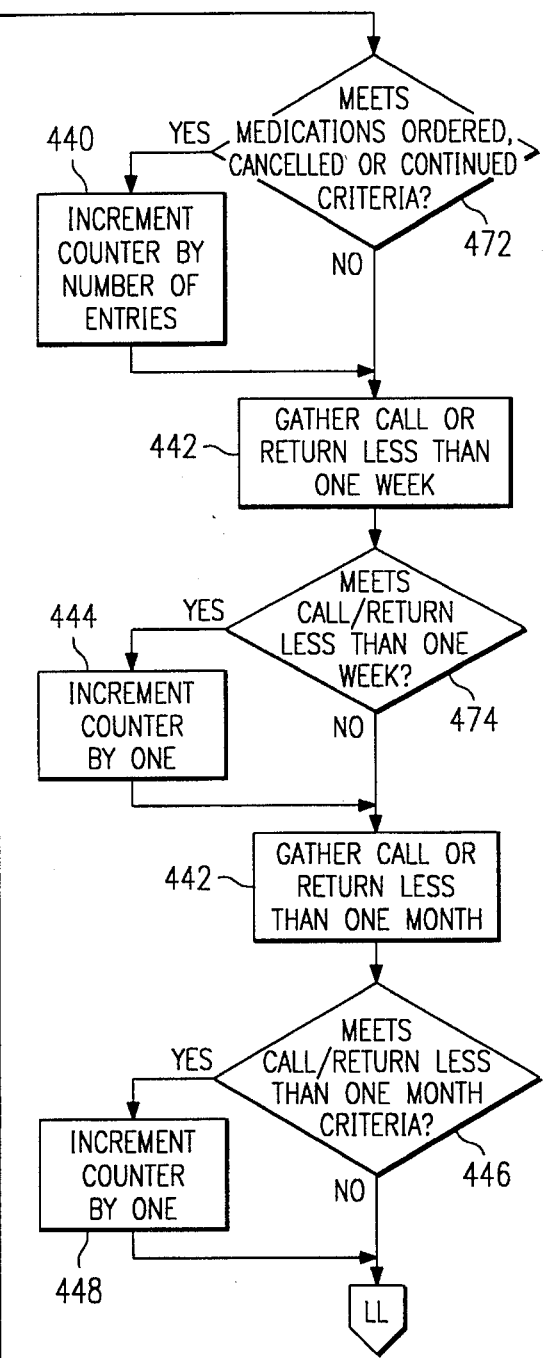
FIG. 4B

METHOD FOR COMPUTING CURRENT PROCEDURAL TERMINOLOGY CODES FROM PHYSICIAN GENERATED DOCUMENTATION

A microfiche appendix is included in this specification as Enhanced Appendix A. Also included is Enhanced Appendix B containing Decision Matrix Tables.

BACKGROUND OF THE INVENTION

This invention relates to medical record documentation and calculating codes from that documentation thereby improving the consistency and the quality of medical care.

Billing for a physician's services has become increasingly more complex in recent years. Medicare requires that a code be assigned to each patient encounter, the interaction between a patient and the physician, assistant, nurse or other health care provider to evaluate the patient's medical problem. These codes encompass the complexity of the problem evaluated, the amount of work required of the physician and the level of detail required in both the history and physical portions of the examination. A third-party payor is an organization, carrier or intermediary that supplies insurance, especially health insurance (including Medicare), to individuals.

The American Medical Association in conjunction with the Health Care Financing Administration (HCFA) has developed a system of codes for the purpose of describing physician work for medical and surgical procedures, diagnostic tests, laboratory studies, and other physician medical services rendered to clients. This system of codes is generally referred to as Current Procedural Terminology, or CPT, codes. They provide a uniform language that details medical, surgical, and diagnostic services utilized by physicians to communicate to third-party payors the services that are rendered.

The Evaluation and Maintenance (E/M) codes are a sub-set of the CPT codes that are used to describe the patient encounter in an office, hospital or other setting. E/M codes are used to describe the level of care (work) a physician renders to a patient. The three key components of an E/M code are history, examination and medical decision making preformed by the provider during an encounter. E/M and CPT codes are revised yearly by the American Medical Association.

The World Health Organization developed a similar method to identify medical diagnoses, conditions and injuries. These codes are International Classification of Diseases 9th edition Clinical Modification (ICD9) codes. They are international codes, unlike the CPT codes which are national.

To manage this increasing complexity, groups such as Medicare Part B and independent companies such as the Physician Management Information Company (PMIC) have developed categorizations of various parts of the patient encounter. These aids usually take the form of checklists on letter or legal sized papers. They are often several pages long and serve to aid the provider in choosing the accurate level of service.

Some individuals have created small (generally 3'x5') cards that some physicians carry in pockets detailing the levels of service and the requirements for each level to insure accurate billing. The card has a general summary of the rules for a particular insurance payor. While providing easier access for the physician than the full size checklists or outlines, these cards provide only general guidelines. Many of the guidelines do not have concrete documentation guidelines. A physical examination, for example, may range from "problem focused" to "comprehensive." The more specific descriptions and examples are found in the CPT manual and several bound texts. These texts may not be easily accessible during the encounter. Moreover, they may not be used to verify a code description until after the encounter is over and the patient has gone home.

Additionally, some professional coders have developed their own plans for classifying the encounters into the appropriate code. These plans usually consist of lists or outlines and chart abstractions. They are applied to the documentation, usually after the encounter is completed, before billing the claim to the insurance carrier.

CodeLink is a software package developed by Context Software Systems, Inc. that compares the CPT code typed by the user to the ICD9 code or codes or vice versa. The two codes are compared based on the medical necessity established by HCFA. The codes are not generated as part of the real-time documentation process, but CodeLink is used as a separate, stand-alone reference after the encounter.

Documation is a software package used for medical documentation and OcuChart is the ophthalmology specific documentation software. Both were developed by Documation Inc. This software has a built-in ICD9 coding system. It does not calculate the E/M codes for billing a level of service.

PRISM is another software package that documents the medical encounter. It was developed by PRISM Data Systems, Inc. PRISM's Patient Registration module prints a list of CPT, E/M, and ICD9 codes selected by the physician. This list is not patient-specific. PRISM also does not calculate E/M codes or other service codes.

None of the known prior documentation code-linkage approaches are able to actually accomplish the long-felt needs of: deriving accurate calculated codes during the documentation process, calculating codes that are as accurate as possible, and doing this in an easy-to-use manner for the provider. Once the coding can be accomplished consistently, the billing process becomes routine. These problems are not limited to a particular medical specialty, but are common to both general practitioners as well as specialists and to a growing group of other limited medical practitioners and insurance payors. Medical specialists are defined as physicians who have chosen to concentrate their interest on one of the body systems or other medical groupings.

It is thus an important object of the present invention to provide the ability to generate codes based on the amount of work performed to describe the patient encounter. Medicare and other third-party payors are increasingly relying on a system of codes to describe the patient encounter. These codes are definable. The original definitions of these codes are contained in a variety of cumbersome texts. Some physicians use one of the shortened aids that are sometimes several pages long. Shorter, pocket sized versions may not completely define all the coding rules and regulations. Even the smallest method presents some degree of intrusion during the physician-patient encounter. The invention incorporates the desired coding scheme into the documentation of the encounter by the provider of services or anyone using the invention.

A further object of the invention is consistent coding. Most of the rules on the checklists and pocket cards are general rules. The invention incorporates rules for each third-party payor into a series of criteria. Specific criteria for each code are met or not met. The codes will then not vary due to differing interpretations. By tying the definition to the actual documentation, the invention provides a more reliable means of coding the encounter and a sense of security for the provider that an accurate code has been billed based on "medically necessary" guidelines.

Another object of the invention is to provide accurate coding. The invention allows derived codes such as E/M codes to be measured objectively. The criteria may be manipulated to give a precise definition for any code. The codes describing the overall encounter are more valid. Accuracy is also a factor when assigning procedural and diagnosis codes like the ICD9 and CPT codes. Human error may factor into any process where numbers are looked up in one source and transcribed into another. The system also allows the physician to select the textual descriptions of terms as an integral part of documenting the encounter. The descriptions are automatically attached to the appropriate code number(s).

A further object of the invention is to provide real-time calculations of the code during the patient encounter. Many of the checklists and other aids are used by the physician or other coder after the encounter: history, examination, medical decision making is completed. The invention calculates the codes as each portion of the encounter is entered into the documentation system. This concurrent calculation assures greater accuracy, consistency and is time-efficient for the physician.

Another object of the invention is to provide additional patient interaction time for the physician. The physician is freed from many medical record keeping tasks allowing for more time for interaction with the patient and family.

Still another object of the invention is linkage of the procedure(s) performed and diagnosis (why the service was rendered) to determine medical necessity. While CodeLink compares ICD9 and CPT codes and determines whether "medically necessity" was established, it does not determine any of the E/M codes or the ophthalmology codes (both are subsets of the CPT codes). This invention gathers the ICD9 and CPT codes during the encounter. This allows the physician or the office staff to save time by not having to look up each ICD9 or CPT code number in the ICD9-CM. Additionally, the medical necessity is determined during the encounter when the procedure is ordered, not after it is preformed, potentially decreasing the number of claims disallowed for not meeting the medical necessity criteria.

An additional advantage of the invention is the printing of a customized summary of the diagnoses, procedures and tests rendered to the patient, including E/M or established ophthalmology code calculated during the encounter. PRISM prints a physician-specific list, but not a patient specific list and does not calculate the E/M or established ophthalmology codes.

Further objects and advantages of this invention will become apparent from a consideration of the drawings and ensuing description. It is further to be understood that many changes and modifications of the embodiment of the invention as hereinafter described may be had without departing from the spirit of the invention as defined in the appended claims.

SUMMARY OF THE INVENTION

This invention allows a physician to record medical data and assign codes to medical diagnoses while the appropriate code associated with the encounter is automatically calculated. Additionally, the charges associated with the code and any other procedural codes are therefore automatically determined.

A patient encounter may be broken into three key components of history, examination, and medical decision making. The history portion usually consists of queries about the patient's current health, previous problems and any related family or social problems. The examination component is the actual physical examination by the physician and any tests or procedures ordered or provided. A third component, the complexity of the medical decision making, is the result of the interaction of the history and examination portions of the encounter and represents the level of difficulty to the physician for forming a diagnosis and treatment plan(s). The basis for the invention is the history and examination portions of the patient encounter and the physician's thought processes and these are broken into generally accepted segments. The physician selects choices from extensive lists that become the basis for the patient's medical record and required documentation.

As each segment of the encounter is completed, credit is given toward assigning a code which becomes the basis for payment from a third-party payor. This code calculates in the background during the encounter based on the physician's documentation of work rendered. The actual calculation of the code is diagramed in the flow charts shown in FIGS. 1 to 8. Having determined the component code, i.e. History, Examination and Medical Decision Making, the final code is calculated independently (FIG. 9) based upon the amount of time since the last encounter. The final codes are determined from this comparison to meet necessary criteria.

The criteria used for each decision point in the flow charts may be varied allowing the system to be customized for different insurance carriers, physician preferences or geographic differences. These criteria could be adjusted due to changing regulations and interpretations by the American Medical Association, The Health Care Financing Agency or other payor groups. They may be adjusted via a criteria entry screen. A set of recommended criteria for various groups is available. An example of a set of criteria would be: Chief Complaint—1 entry; Present Illness—1 entry for History-component Code A, 3 entries for History-component Code B, C, or E; Specialty Specific Conditions and Diseases—1 entry; Specific Systemic Diseases—1 entry; Medications—1 entry; Allergies—1 entry; Family History—1 entry for History-component Codes A, B or C, 2 entries for History-component Code E; Social History—1 entry for History-component Code A, B, or C, 2 entries for History-component Code E; Medical History—1 entry for History-component Code A, B, or C, 2 entries for History-component Code E; Specialty Specific Surgery—1 entry for History-component Code A, B, or C, 2 entries for History-component Code E; Surgical History—1 entry for History-component Code A, B, or C, 2 entries for History-component Code E; Systems Review—0 entries for History-component Code A or B, 1 entry for History-component Code C, 15 entries for History-component Code E; Vision—1 entry; Confrontational Visual Fields—1 entry; Eyelids—1 entry; Ocular Motility—1 entry; Pupils/Iris—1 entry; Cornea—1 entry; Anterior Chamber—1 entry; Lens—1 entry; Intraocular Pressure—1 entry; Retina—1 entry; Optic Disc—1 entry; Criteria G—meets 8 of 10 criteria (Confrontational Visual Fields, Eyelids, Ocular Motility, Pupils/Iris, Cornea, Anterior Chamber, Lens, Intraocular Pressure, Retina, Optic Disc); Criteria H—all of one sub-group (eyelids, lacrimal, orbit; anterior segment cornea, anterior chamber, iris, lens, intraocular pressure;

optic disc, sensory function, visual fields); Criteria J—meets 2 of criteria; Criteria K- meets 1; Data Reviewed—1 entry for Data-reviewed-subcomponent Code D, 2 entries for Data-reviewed-subcomponent Code E; High Risk Medications—1 entry; Age—less than 5 or over 65, Invasive Office Procedures—1 entry; High Risk Diagnoses—1 entry; Specific Test Results—pressure over 20 mm Hg; Present Illness—1 entry for Management-options-subcomponent Code A or B, 2 entries for Management-options-subcomponent Code D, 3 entries for Complexity-subcomponent Code E; Allergies to Specific Medications—1 entry, Current Selected Medications—1 entry for Management-options-subcomponent Code D, 2 entries for Management-options-subcomponent Code E; Current Systemic Medications—1 entry; Specific Family History—1 entry; Specific Diagnostic Results—vision corrected <20/60; Total Diagnoses—1 Management-options-subcomponent Code A or B, 2 entries for. Management-options-subcomponent Code C or D, 3 entries for Management-options-subcomponent Code E; Medications Ordered, Cancelled or Continued—1 entry for Management-options-subcomponent Code B, C or D, 2 entries for Management-options-subcomponent Code E; Call or Return Less Than One Week—1 entry; Call or Return Less Than One Month—1 entry. An example of how the criteria are tied together is given below.

Additionally the system allows physicians to switch between various code assignments. For example, currently ophthalmologists are allowed to use one of two coding systems to describe an encounter to Medicare, the E/M codes and the Established or Secondary Ophthalmology codes. Both codes in this invention are calculated simultaneously allowing a physician to merely switch back and forth between the codes. In the same way, they could change between a variety of payors and their differing requirements.

BRIEF DESCRIPTION OF THE DRAWINGS

Now referring to the drawings:

FIG. 3 is a flow chart of the Medical Decision Making component;

FIGS. 4A–4C show a flow chart of the Number of Diagnoses or Management Options sub-component of Medical Decision Making;

DESCRIPTION OF EMBODIMENTS OF THE INVENTION

All portions of the patient encounter may be entered into the invention in any order. A physician may also enter one portion of a section and then return and enter additional information in that section. The FIGURES are presented in the order that many patient encounters are conducted. Definitionally, a component is one of the major areas of the encounter (e.g., History, Examination or Medical Decision Making), a sub-component is an additional division of a component, and a section is a specifically defined area of the encounter (e.g., chief complaint or eyelid). In the flow charts, the rectangular-shaped process boxes identify the sections. The diamond shaped decision boxes identify where the criteria for a particular section are tested.

Each section has various criteria associated with it. Whether or not each criterion is met determines the associated code. As new information is added to each section, the code is recalculated according to the criteria-set (i.e. the criteria for a particular third-party payor) currently being used.

Figure 1A:
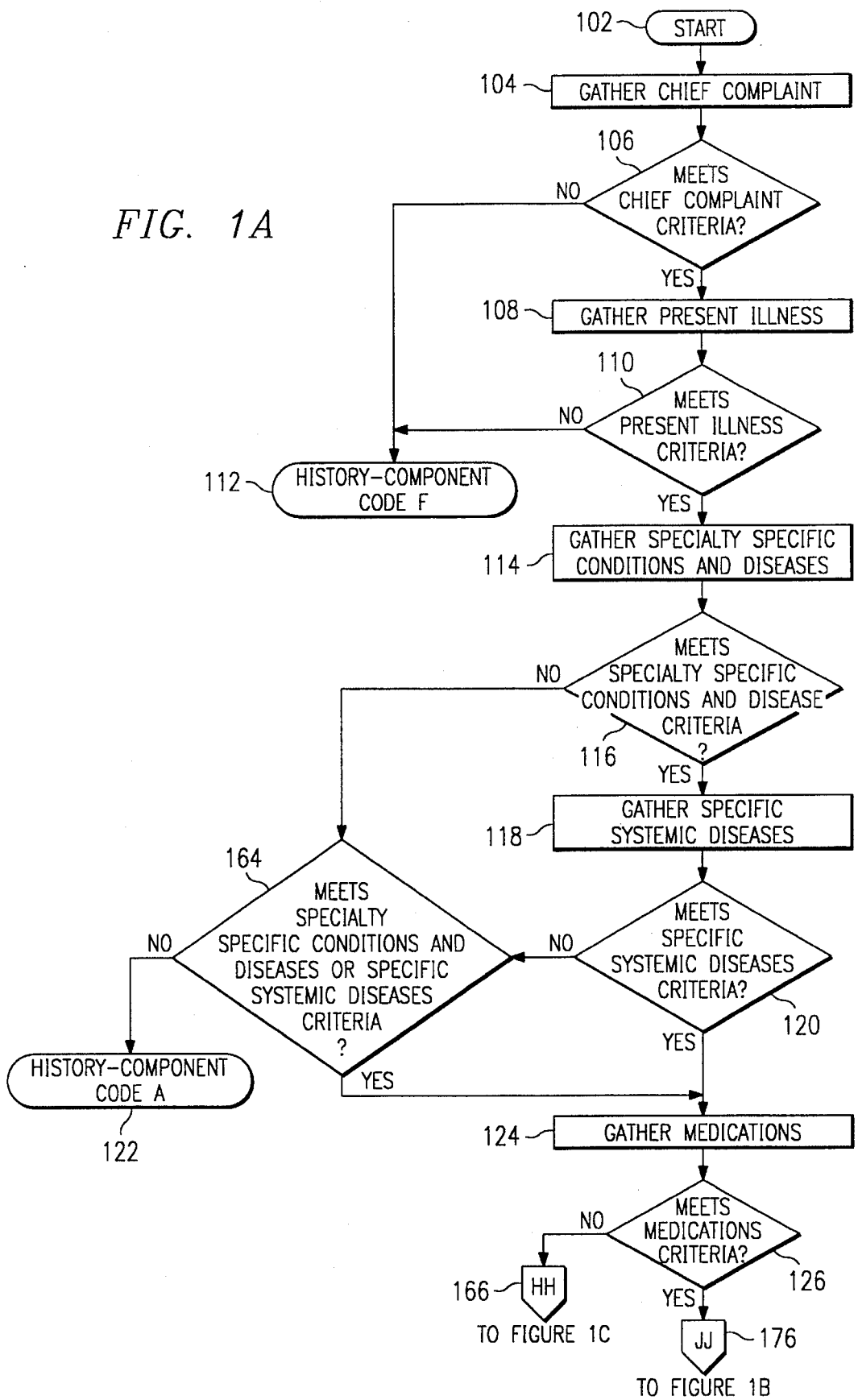
FIGS. 1A–1C show flow chart of the History component.
Figure 1B:
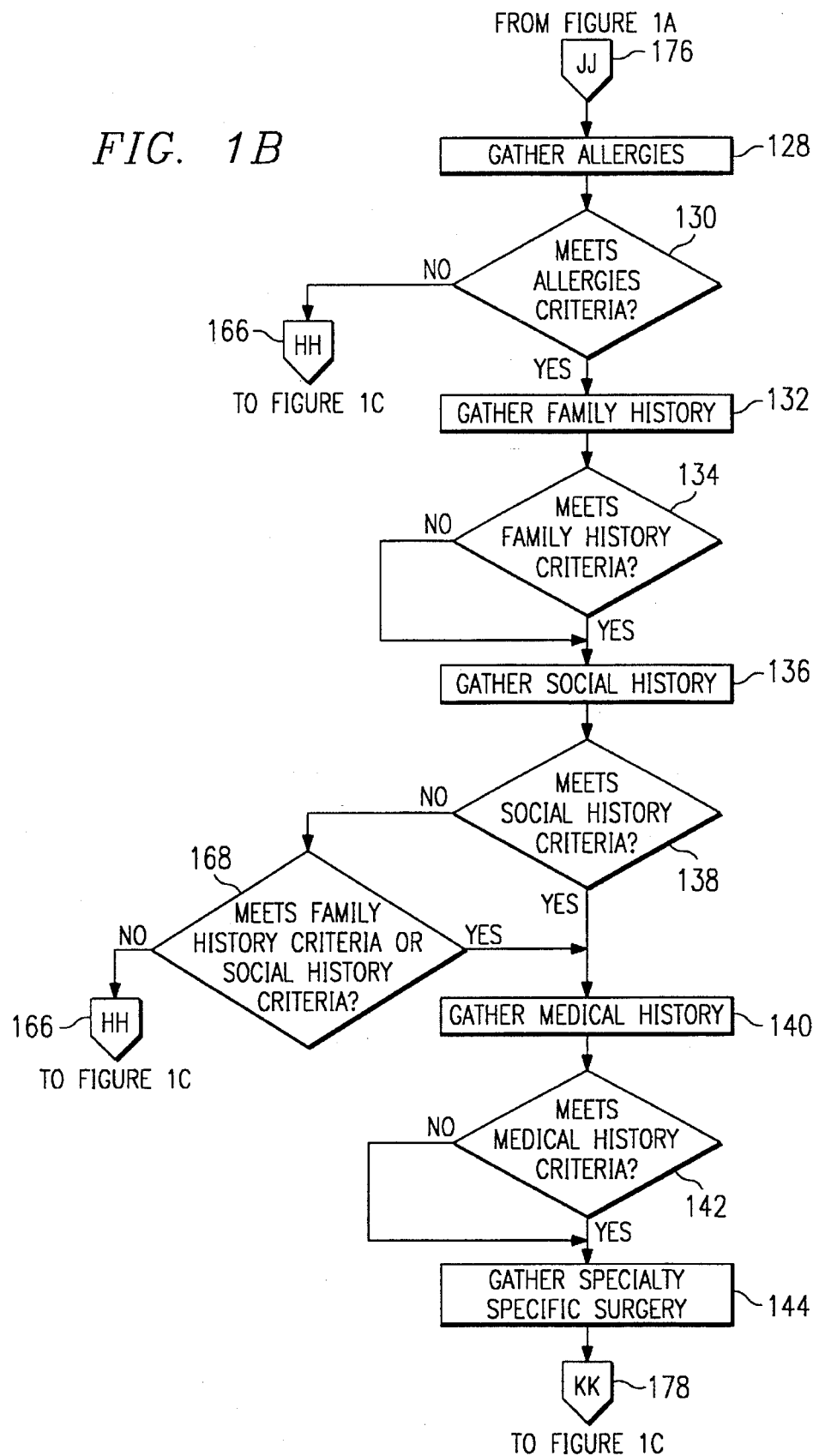
Figure 1C:
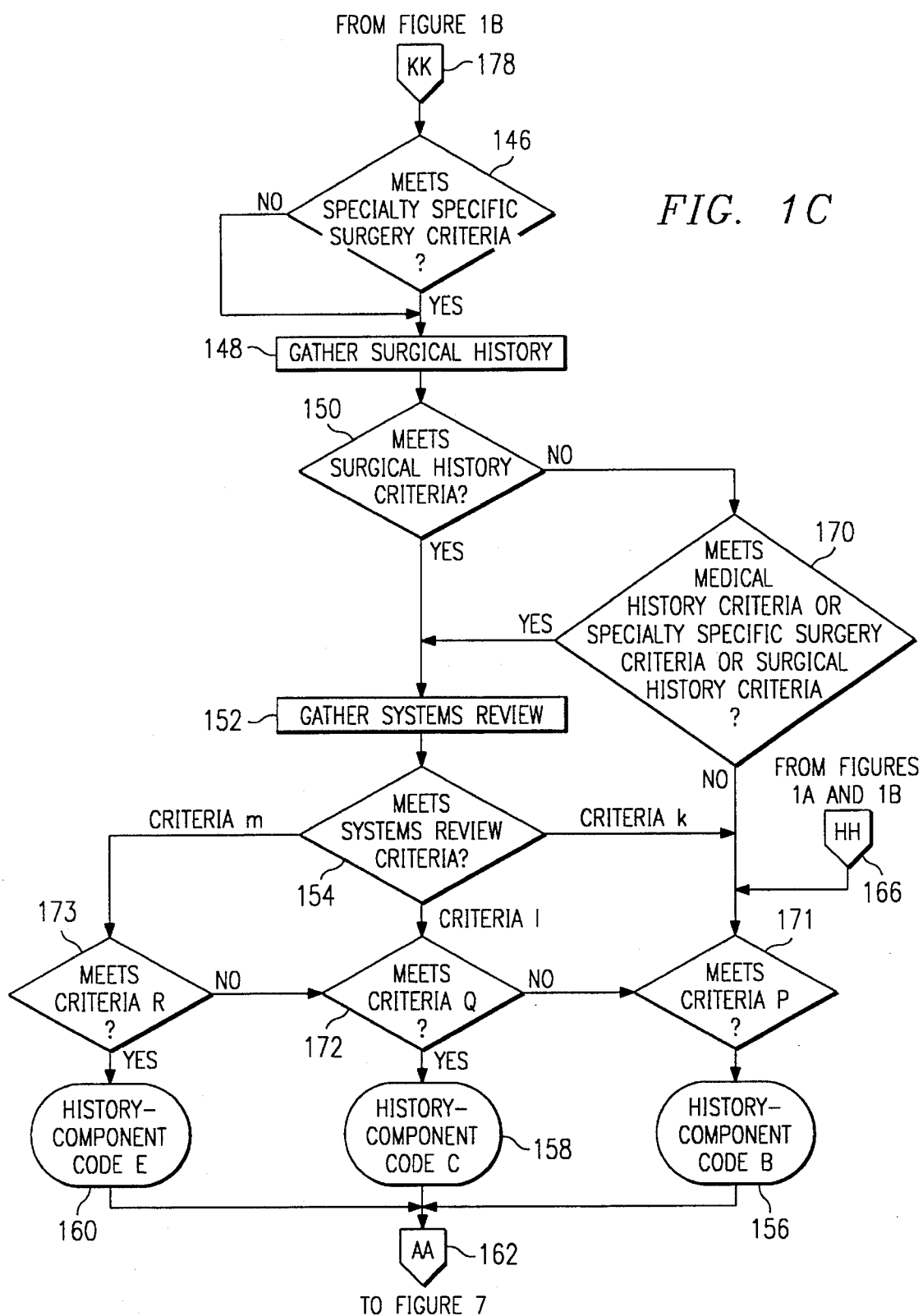

FIGS. 1A–1C show the History component of the encounter. There are twelve sections in the History component. They include: a Chief Complaint section 104, a Present Illness section 108, a Specialty Specific Conditions and Diseases section 114, a Specific Systemic Diseases section 118, a Medications section 124, an Allergies section 128, a Family History section 132, a Social History section 136, a Medical History section 140, a Specialty Specific Surgery section 144, a Surgical History section 148, and finally a Systems Review section 152.

Figure 2:
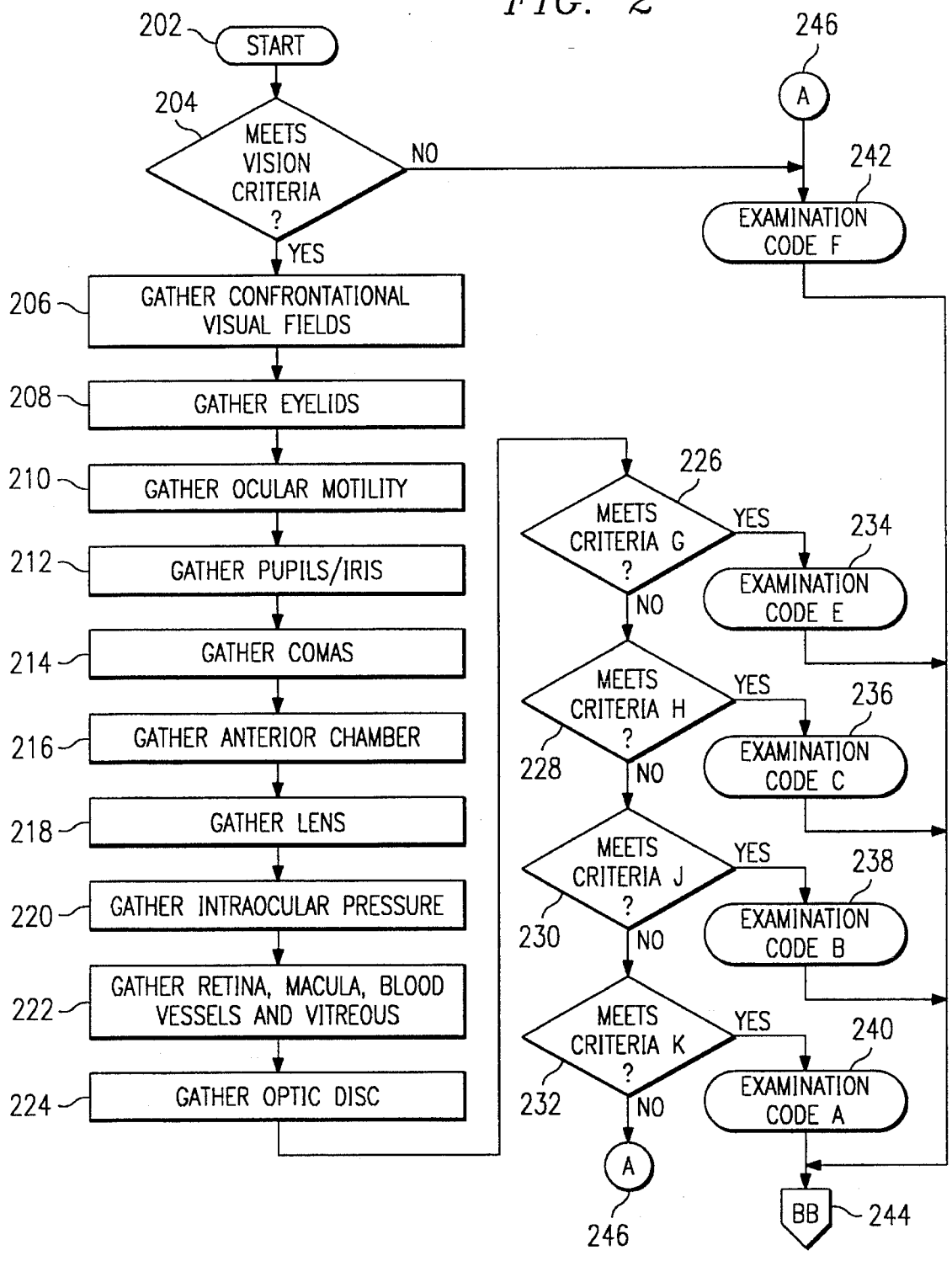
FIG. 2 is a flow chart of the Examination component.

FIG. 2 details the Examination component of the encounter. There are 10 sections in the ocular examination. They include: a confrontational visual fields section, an eyelids section, an ocular motility section, a pupils/iris section, a cornea section, an anterior chamber section, a lens section, an intraocular pressure section, a retina section, and an optic disc section. Like the History component, each section of the Examination component may be completed in any order.

Figure 5:
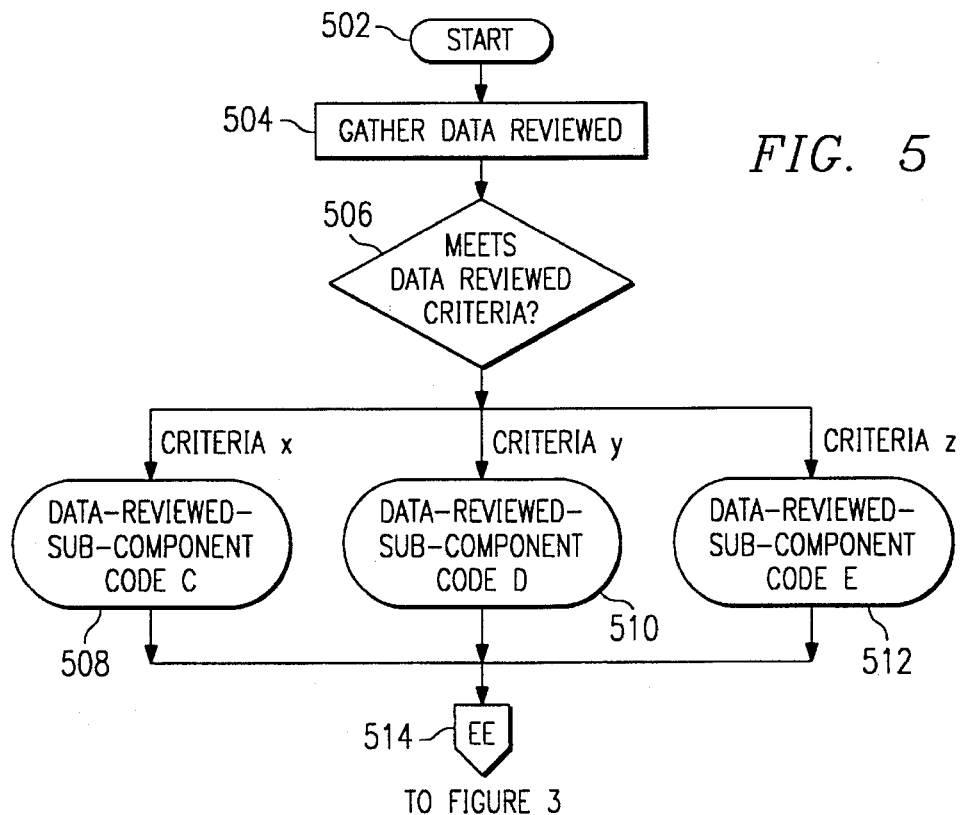
FIG. 5 is a flow chart of the Complexity of Data Reviewed sub-component of Medical Decision Making
Figure 6:
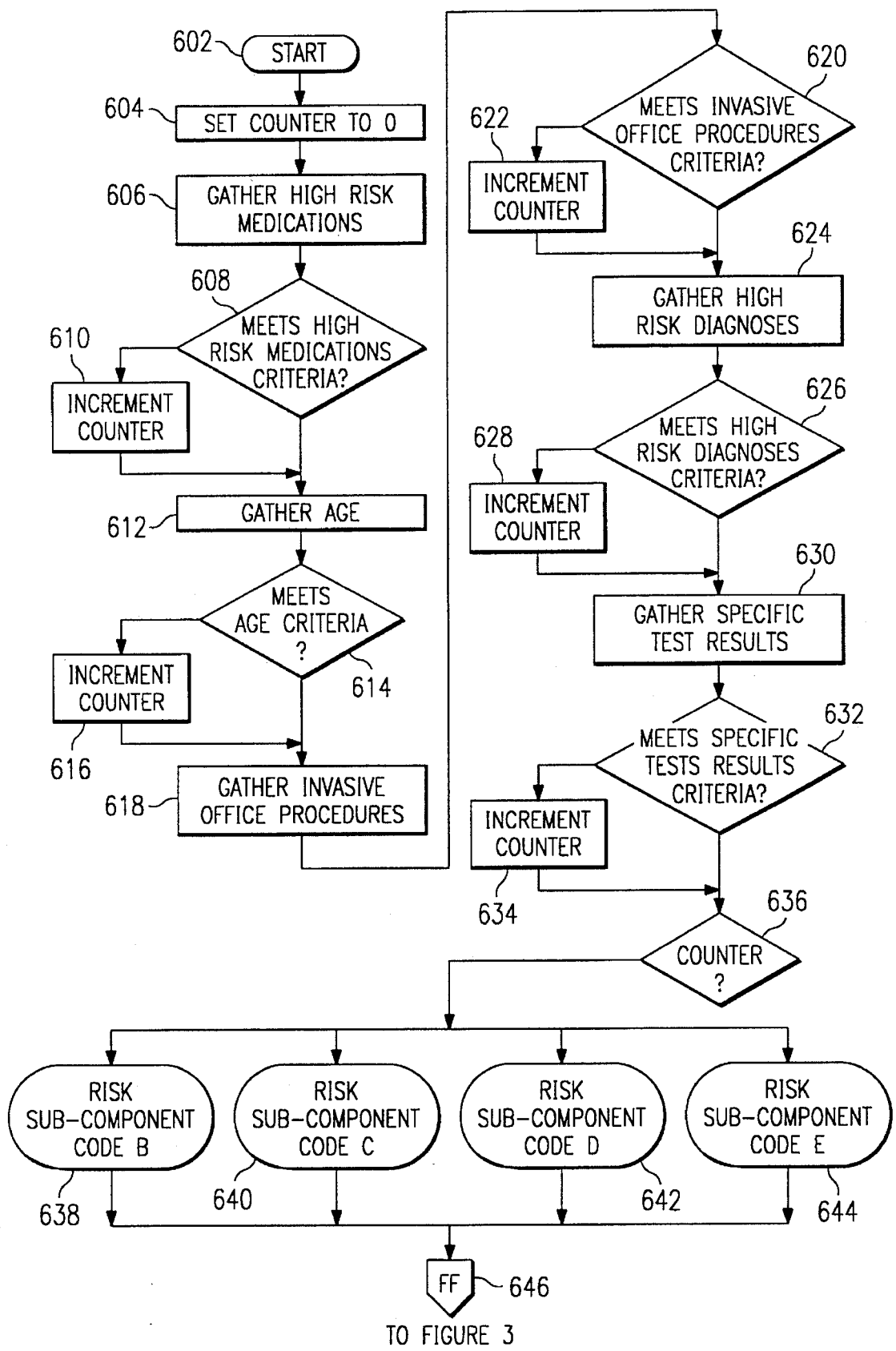
FIG. 6 is a flow chart of the Risk of Complication and/or Morbidity or Morality sub-component of Medical Decision Making.

The Medical Decision Making component (FIG. 3) consists of three sub-components, Number of Diagnoses or Management Options (FIGS. 4A–4C), Complexity of Data Reviewed (FIG. 5), and Risk of Complications and/or Morbidity or Mortality (FIG. 6). The Medical Decision Making component is illustrated in FIG. 3. The code from each sub-component (302, 304, and 306) is compared to the criteria and the appropriate MDM-component code selected. The sub-components of Medical Decision Making use sections from the History and Examination components as well as additional information.

Figure 4C:
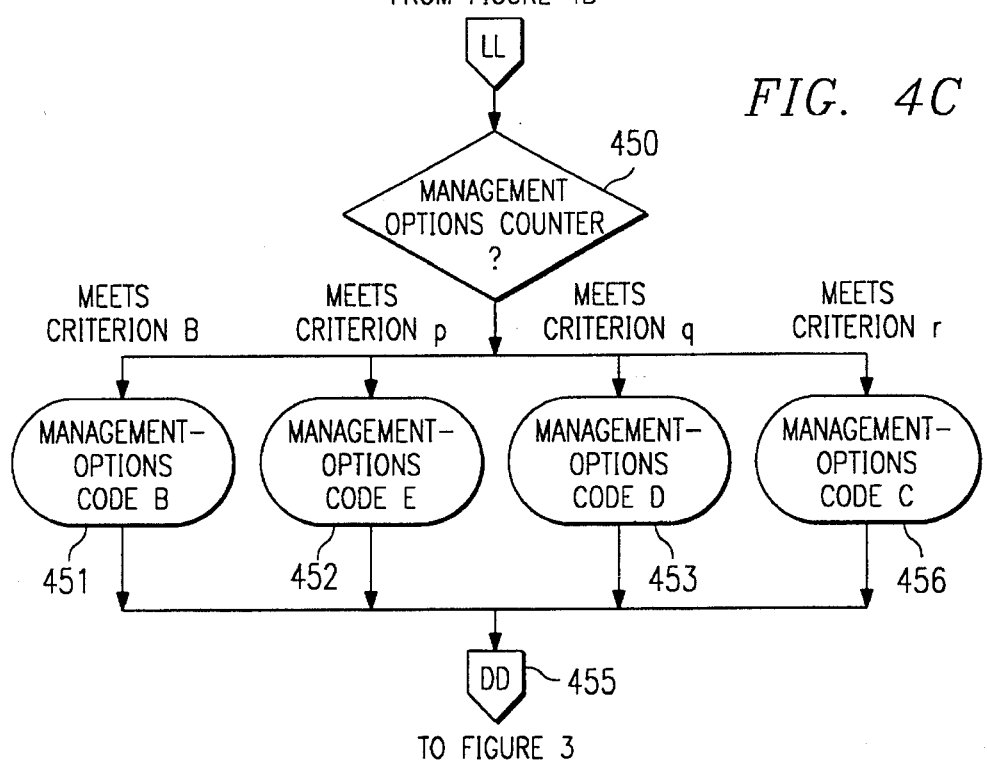

The Number of Diagnoses or Management Options sub-component is shown in FIGS. 4A–4C. The sections in this sub-component include: Present Illness 108, Allergies 128, an Allergies to Specific Medications section, Current Selected Medications and Current Systemic Medications. Additional sections are a Specific Family Diseases section (a subset of Family History 132) and a Specific Diagnostic Results section. A calculated section, Total Diagnoses, is also included. It is followed by a Tests and Procedures Ordered section and a Medications Ordered, Cancelled, or Continued section. Finally, a Call or Return Less Than One Month section and a Call or Return Less Than One Week section are included. A final section, Management Options Increment, compares the counter to the criteria and determines the Management-options-subcomponent code. Complexity of Data Reviewed, FIG. 5, is the next sub-component of the Medical Decision Making component. A Data Reviewed section 506 determines the Data-reviewed-sub-component Code for this sub-component.

The Risk of Complications and/or Morbidity or Mortality is illustrated in FIG. 6. A High Risk Medications section 608 (a subset of Medications 124) is followed by an Age section 614, an Invasive Office Procedures section 620 (a subset of Tests and Procedures Ordered 434) and a High Risk Diagnoses section 626. A Specific Test Results section 632 also is included. A final section, Risk Counter 636, compares the counter to the criteria and determines the Risk-subcomponent Code for this subcomponent.

Figure 8:
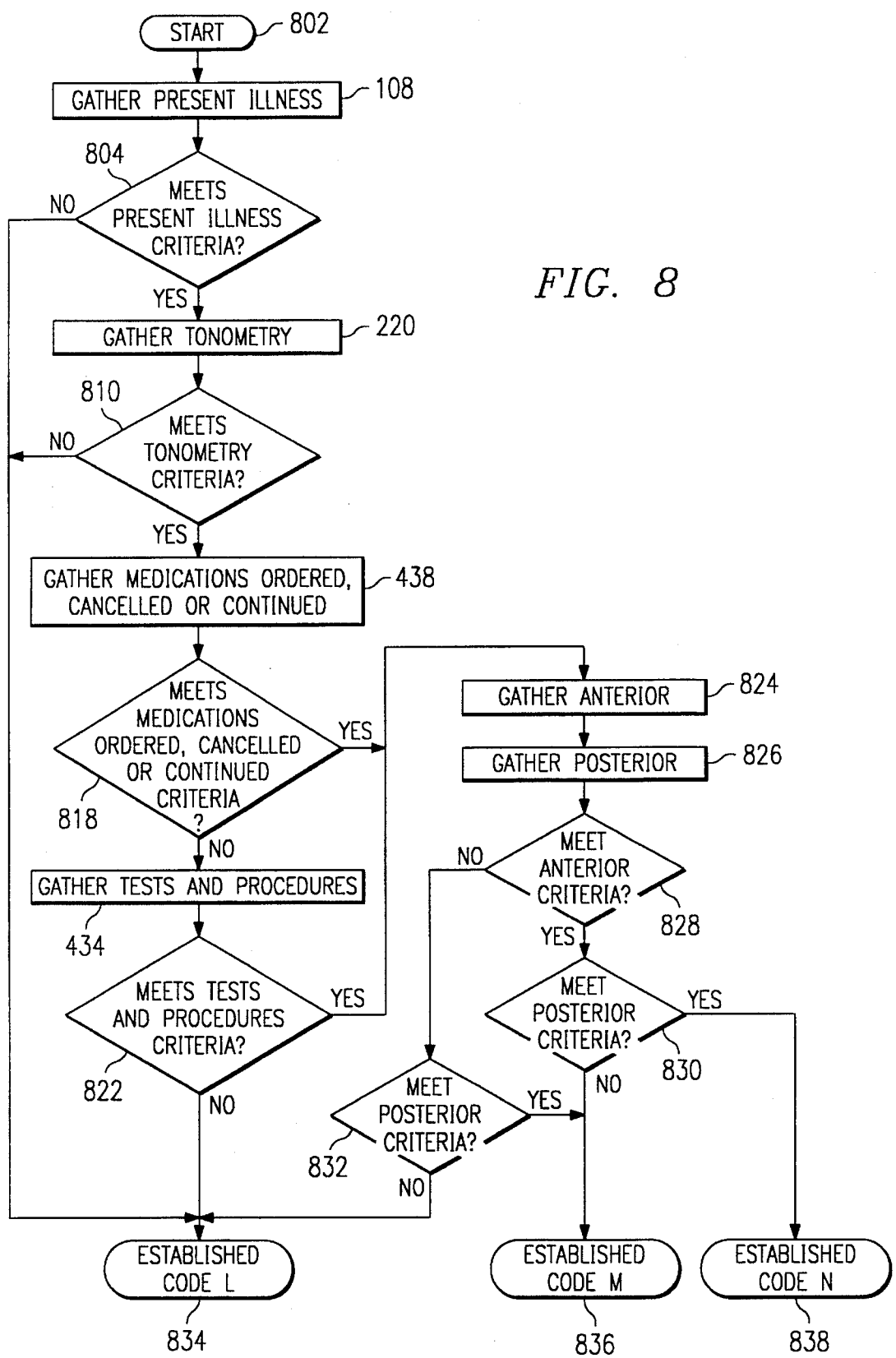
FIG. 8 is a flow chart of the Established or Secondary Ophthalmology Code.

The Established or Secondary Ophthalmology Code, FIG. 8, calculates a separate type of code used by ophthalmologists. It consists of Present Illness, a Tonometry section, Medications Ordered, Canceled or Continued, and Tests and Procedures Ordered. It also includes an Anterior section and a Posterior section.

OPERATION OF INVENTION

Figure 7:
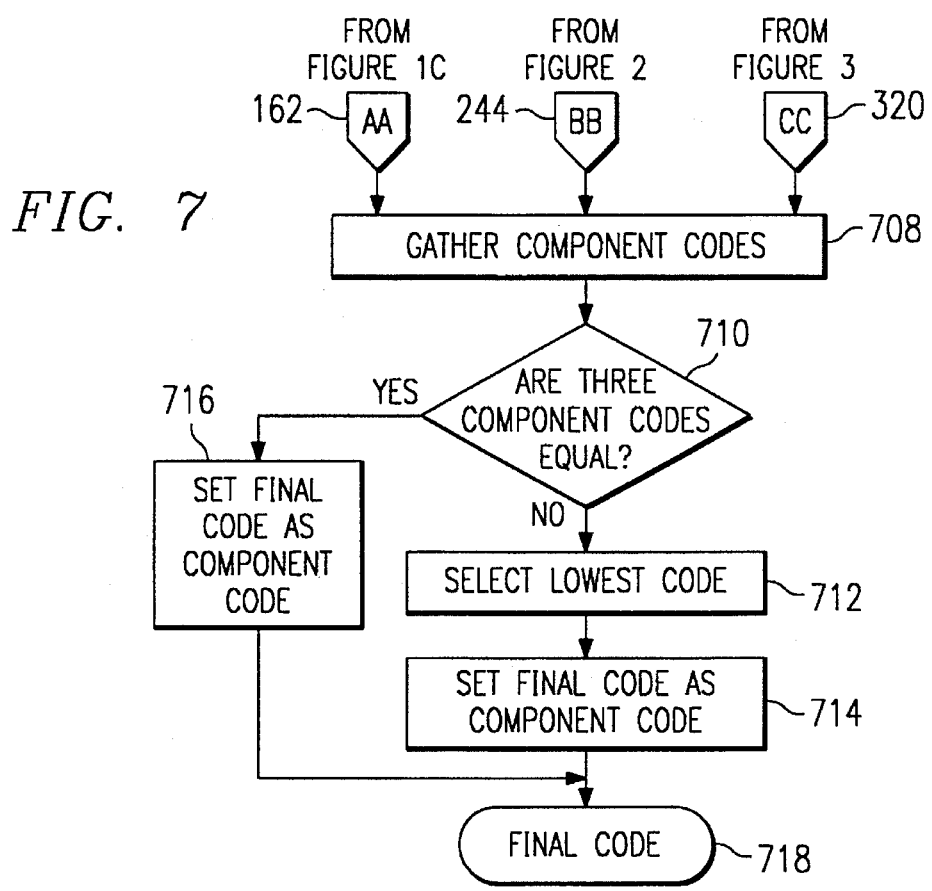
FIG. 7 is a flow chart of the Overall New Patient Code.

The final code for new patients is determined by the component codes calculated from the History component 158, the Examination component 224 and the Medical Decision Making component 320 as shown in FIG. 7. Each component code (History, Examination and Medical Decision Making) is determined in the process illustrated by FIGS. 1A–1C, 2 and 3. These three component codes are compared according to the criteria and the final code 718 is determined. If the three component codes (calculated from History, Examination, and Medical Decision Making) are identical 710, the Final Code is the component code 716. If the three component codes are different 712, the lowest component code is the Final Code 718. This process is repeated whenever any of the History, Examination and Medical Decision Making component codes change. It continues until the patient encounter is over and the medical record for that encounter has been sealed.

A different set of criteria may be available for each insurance payor. Each criterion is linked to a particular section. A section may have several criteria, but each criterion is only associated with a particular section.

The manner for determining the code associated with the History-component, FIG. 1 is that as elements are added to each section, the elements are checked to see if specific criteria are met. After the criteria are reviewed the History-component code is calculated. This process is repeated with each addition in all sections of the history component–criteria are checked and History-component codes recalculated. In this component, as in all the components, the actual order that each section is completed is irrelevant; the order is presented as a series of decision points rather than an order of entry.

Chief Complaint 104 is gathered. If this section meets the specified criteria 106, Present Illness 108 is gathered. If Chief Complaint 104 does not meet the criteria, History-component Code F 112 is obtained. If Present Illness 110 does not meet the criteria, History-component Code F 112 is obtained. If Present Illness 110 meets the criteria, then Specialty Specific Conditions and Diseases 114 is investigated along with Specific Systemic Diseases 118. If the criteria is not met for either section 116 or 120, History-component Code A 122 will result. If the criteria for sections 116 and 120 are met, the History-component code could be assigned History-component Code E 160. If the criteria for sections 116 or 120 are met, Medications section 124 is checked. If the criteria 126 are met, Allergies 128 are collected. If the criteria for Medications 126 are not met, History-component Code B 156 ensues. History-component Code B 156 also follows if the criteria for Allergies 130 are not satisfied. When the criteria associated with Allergies 130 is met, information about Family History 132 and Social History 136 is compared to their respective criterion (134 and 138). If neither of these criteria are met, History-component Code B 156 will be determined. If both criteria 134 and 138 are met, the History-component code could be assigned History-component Code E 160. When criteria for Family History 134 or Social History 138 are fulfilled, information about Medical History 140, Specialty Specific Surgery 144 and Surgical History 148 are gathered. If the criteria for none of the three sections (142, 146, or 150) are met, History-component Code B 156 results. When the criteria for at least one of sections 142, 146 or 150 are met, information about Systems Review 152 are checked. If criterion 154 is criterion k, History-component Code B 156 results, but if criterion 154 is l, History-component Code C 158 results. If criterion 154 is m, and the criteria for both 116 and 120 and the criteria for both Family History 134 and Social History 138 as well as the criteria for Medical History 142, Specialty Specific Surgery 146 and Surgical History 150, the result is History-component Code E 160. The resulting Code 162 is carried to process illustrated in FIG. 7, Overall New Patient Code.

The manner for determining the code associated with the Examination component, FIG. 2 is that as elements are added to each section, the elements are checked to see if specific criteria are met. After the criteria are reviewed the Examination-component code is calculated. This process is repeated with each addition in all sections of the Examination component.

Vision 204 is the first section of the Examination component and if the criteria 204 is not met, Examination-component Code F 242 results. If the criteria 204 associated with Vision is met, the Visual Field section 206 is gathered. The Eyelids section 208 is gathered. The Ocular Motility section 210 and the Pupils/Iris section 212 are collected. Next, Cornea 214 is gathered. Anterior Chamber 216 is obtained Then Lens 218 is collected. Intraocular Pressure 220 is gathered followed by Retina 222. The final section collected is Optic Disc 224. If the Criteria G 226 is met, the resulting examination-component code is Examination-component Code E 234. If Criteria G is not met, but the Criteria H 228 is met, the examination-component code is Examination-component Code C 236. If Criteria H is not met, but the Criteria J 230 is met, the examination-component code is Examination-component Code B 238. If Criteria J is not met and Criteria K is met, examination-component Code A 240 is assigned. Examination-component Code F 242 is assigned if Criteria K is not met. The resulting examination-component code is carried into the process illustrated by FIG. 7, Overall New Patient Code as 244. The manner for determining the MDM-component code associated with the Medical Decision Making (FIG. 3) component is that as elements are added to each section of each sub-component (302, 304 or 306), the elements of the sub-component are checked to see if specific criteria are met. After the criteria are reviewed the code for the sub-component is calculated. This process is repeated with each addition in all sections of all sub-components of the Medical Decision Making component. The MDM-component code associated with Medical Decision Making is recalculated whenever any of the sub-component codes have been revised. The resulting MDM-component Code 320 is carried into the process illustrated by FIG. 7, Overall New Patient Code.

The first sub-component is Number of Diagnoses or Management Options, FIG. 4. Present Illness 108 is gathered and if it meets the criteria 476, the counter 404 is incremented. Allergies 128 is then collected and the counter 408 is incremented if the criteria 478 are met. Allergies to Specific Medications 410 is gathered and the counter 412 is incremented if the criteria 458 are met. Next, Current Selected Medications 414 is obtained. The counter 416 is incremented if the criteria 460 are met. Then, Current Systemic Medications 418 is collected and if the criteria 462 are met, the counter 420 is incremented. Specific Family History 422 is obtained next. If the criteria 464 are met, the counter 424 is incremented. Specific Diagnostic Results 426 is collected and the counter 428 is incremented if the criteria 466 are met. Then Total Diagnoses 430 is gathered and if the criteria 468 are met, the counter 432 is incremented. Tests and Procedures Ordered 434 are gathered and if the criteria 470 are met the counter 436 is incremented. Medications Ordered, Cancelled or Continued 438 is obtained next. The counter 440 is incremented if the criteria 472 are met. Then Call or Return Less Than One Week 442 is gathered and if the criteria 474 are met, the counter 444 is incremented. Then, Call or Return Less Than One Month 474 is gathered and if the criteria 446 are met, the counter 448 is incremented. The next section is Management Options Counter 450. Finally, the Management Options Counter 450 determines the Data-reviewed-subcomponent Code (452, 453, 454 or 456) based on the associated criteria. The Data-reviewed-subcomponent Code 452, 453, 454 or 456 is carried into the process illustrated by Medical Decision Making, FIG. 3 at 455.

The second sub-component of Medical Decision Making is Complexity of Data Reviewed, FIG. 5. The Data Reviewed section 504 is gathered. If criterion x is met, Management-options-subcomponent Code C 508 results. Meeting criterion y determines Management-options-subcomponent Code D 510 and Management-options-subcomponent Code E 512 results from meeting criterion z. The Management-options-subcomponent Code 514 is entered into the process illustrated by FIG. 3.

The final sub-component of Medical Decision Making is illustrated in FIG. 6, Risk of Complications and/or Morbidity or Mortality. High Risk Medications 606 is collected. If the criteria 608 are met, the counter 610 is incremented. Age 612 is gathered and the counter 616 is incremented if the criteria 614 are met. Invasive Office Procedures 618 is collected and if the criteria 620 are met, the counter 622 is incremented. High Risk Diagnoses 624 is obtained. The counter 628 is incremented if the criteria 626 are met. Specific Test Results 630 is collected and if the criteria 632 is met the counter 634 is incremented. Finally, the Risk Counter 636 determines the Risk-subcomponent code based on the associated criteria. If criterion w is met, Risk-subcomponent Code B 638 results. Risk-subcomponent Code C 640 occurs if criterion x is met and Risk-subcomponent Code D 642 if criterion y is met. Risk-subcomponent Code E 644 follows from criterion z. The Risk-subcomponent Code 646 is carried into the process illustrated by FIG. 3, Medical Decision Making at 306.

The manner for determining the code associated with the Established or Secondary Ophthalmology Code, FIG. 8, is that as elements are added to each section, the elements are checked to see if specific criteria are met. After the criteria are reviewed, the Established or Secondary Ophthalmology code is calculated. This process is repeated with each addition in all sections of the Established or Secondary Ophthalmology Code.

First, Present Illness 108 is gathered. If the criteria 806 are not met, Established or Secondary Ophthalmology Code L 334 is obtained. If the criteria 806 are met, Tonometry 808 is collected. Established or Secondary Ophthalmology Code L 334 is also obtained if criteria 810 are not met. If the Tonometry criteria 810 are met, Medications Ordered, Cancelled or Continued 438 is collected and if the criteria 818 are met, Anterior 824 is gathered. If the 818 criteria are not met, Tests and Procedures Ordered 434 are gathered. If the criteria 822 are not met, Established or Secondary Ophthalmology Code L 834 is obtained. If the criteria 822 are met, Anterior 824 and Posterior 826 are gathered. If the criteria 828 and 830 are both met, Established or Secondary Ophthalmology Code N 838 is obtained. If the criteria are met for Anterior 828 or Posterior 830, Established or Secondary Ophthalmology Code M 836 is obtained and if the criteria are met for neither Anterior 828 nor Posterior 830, Established or Secondary Ophthalmology Code L 834 is obtained.

This system has the ability to immediately convert between the Established or Secondary Ophthalmology Codes and the E/M Codes for a particular encounter. Simply by selecting the code option, the physician can change between these two codes.

Figure 9:
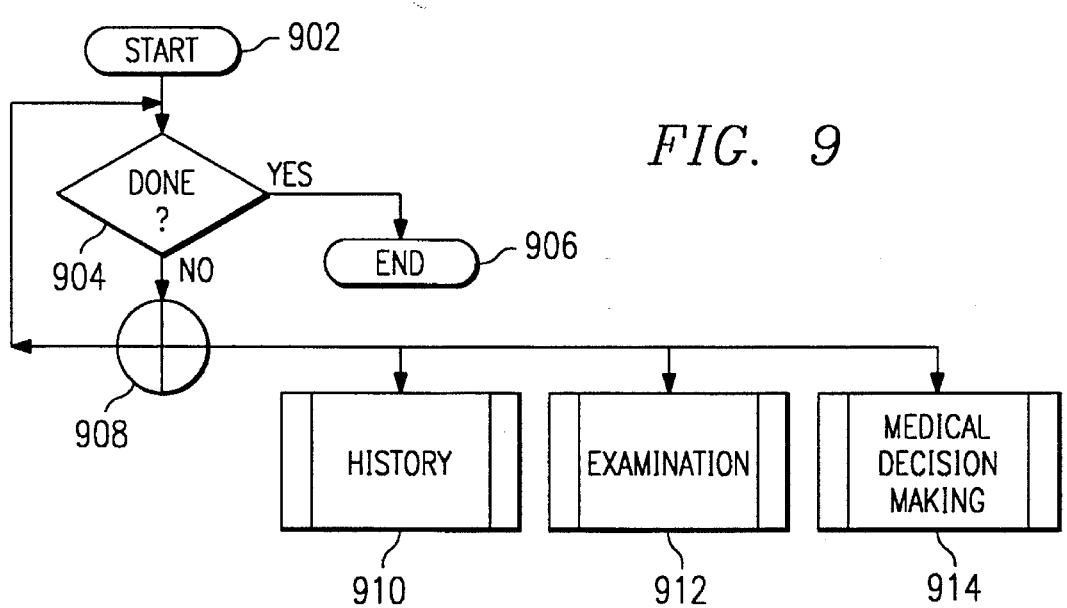
FIG. 9 is a flow chart of the General Rule Engine.

FIG. 9 describes a General Rules Engine. When the encounter begins, it is determined if the process is done (904). If the process is done, the process is ended. If the process is not done, the predefined process of either History (910), Examination (912) or Medical Decision Making (914) are investigated.

Facts may have a number associated with them for consideration by an expert system engine. These rules are expressed using logic. The engine then takes these facts and applies rules to see which conclusions may be established. The rule engine in this invention also considers the number of times a particular rule is met. An example of this occurs in the History component where in order to obtain History-component Code E 15 of the Systems Review areas must be addressed, but only 1 area for History-component Code C. This could be addressed using a very large set of rules with a conventional rule engine. To address only the History-component Code C portion, for a convention engine exponentially more rules would have to be stated than the one rule for the proposed engine. The proposed engine would use a much smaller rule base since all the facts would not have to be explicitly specified.

EXAMPLES

To illustrate the above components, several examples are cited. These examples use ophthalmology as a specialty. The Medicare set of criteria is also used since it is a wide-spread third-party payor, especially in ophthalmology. The invention is not specialty specific. It can be applied to any medical specialty with ease. Additionally, by changing the criteria-set it can be tailored to various payors' systems.

The first example concerns a 24 year old female requesting an examination for glasses. This causes an entry in box 104, chief complaint; and item 612. She has never been to this physician before and is a new patient. Her vision is blurred at a distance and she has trouble reading street signs, especially at night. She also has been having headaches for the past two weeks. These three statements cause an entry in box 108 and the criteria 110 are met. She currently wears contact lenses and has for three years and this information creates an entry in box 114, specialty specific conditions and diseases. She is currently taking antibiotics for a sinus infection, triggering box 124 and has no allergies, filling box 128. Her mother had cataracts which were removed and replaced with an intraocular implant and her paternal grandfather had glaucoma, filling box 132, family history. She states she has never had any ocular surgeries (144) and has a medical history of sinusitis (142). She denies having any migraines, hypertension or diabetes (152). On further questioning it was learned she sees "halos" when driving at night from oncoming car headlights. Her headaches are dull and aching and she usually wakes up with headaches in the morning (152). Using the system, the History-component code for this patient would be History-component Code C (158).

Her vision (204) is then checked and found to be OD 20/60 and OS 20/80. The refraction manifest is OD −3.00+1.00×90, OS −3.00+1.00×90. Confrontational visual fields (206) are normal. The lens (218) is normal with no indications of cataracts. Her intraocular pressure (220) is 18 mm Hg OU by applanation. Her retinas (222) are normal. The disc (224) is normal with no cupping. The Anterior Chamber (216) and iris (212) are normal. Eyelids (208) are normal. The resulting Examination-component code for this patient would be Examination-component Code E (234).

The Number of Diagnoses or Management Options subcomponent would result in Management-options-subcomponent Code C (454). No High Risk Medications (606) were being used. She does not meet the Age (614) criteria since at 24 she is under 65 and over 5 years old. Her physician did not perform any Invasive Office Procedures (618) and no High Risk Diagnoses (626) were noted. The patient's intraocular pressure was less than 20 mm Hg and so the Specific Test Results (632) criteria is not met. The Risk of Complications and/or Morbidity or Mortality sub-component would be Risk-subcomponent Code B (638) and the Complexity of Data Reviewed sub-component would yield Management-options-subcomponent Code C (510) based on the amount of data reviewed (506). The Medical Decision Making component's code would be MDM-component Code C (320) since the middle of the three subcomponent codes (454, 638, and 510) is a MDM-component Code C.

The Established or Secondary Ophthalmology code would be Established or Secondary Ophthalmology Code N (838).

CONCLUSIONS, RAMIFICATIONS AND SCOPE

The invention described here is a system for converting medical documentation into a variety of codes, providing an effective and consistent means for calculating a basis for reimbursement. The system is consistent and by prompting physicians to provide information in a reproducible form, will significantly improve the quality of medical care as well as provide a means to gauge the effectiveness of various treatment regimens.

There are currently a number of medical documentation systems that provide a means for documentation; but there are none that enable a physician to gauge the extent of his work effort in a consistent manner. Moreover, the other documentation systems do not calculate a concrete code to describe the more abstract effort levels expended during the patient encounter.

By tying the system to the documentation process, additional material such as code books are not needed and physicians will be encouraged to extensively document their work because of the ease with which they can accomplish this. Coding the diagnoses during the real-time of the encounter will improve the quality of the coding and the information gathered.

It is our belief that by improving the information produced by a medical documentation system, the invention will encourage physicians to use such a system and thereby improve the quality of medical care for all.

ENHANCED APPENDIX B

| | | | 99201 Problem Focused | 99202 Expanded Problem Focused | 99203 Detailed | 99204 Comprehensive | 99205 Comprehensive |
|---|---|---|---|---|---|---|---|
| | | | | Decision Matrix - New Patient | | | |
| HISTORY | Chief Complaint | | x | x | x | x | x |
| | Present Illness | Vision/Function Pain Appearance Pre-Existing Condition Trauma | Requires a minimum of 1–2 statements in any of these sub-menus | 99202–99205 require a minimum of 3 statements in any of these sub-menus (Vision/Function, Pain, Appearance, Pre-Existing Condition, Trauma) | | | |
| | Severity of Presenting Prob | (does not drive E&M code) | 2 | 3 or 4 | 4 | 4 or 5 | 4 or 5 |
| | Past Ocular History | Ocular Problems/Diseases | | | x/— | x/— | x/— |
| | | Ocular Surgeries | | | x/— | x/— | x/— |
| | | Oculo-Systemic Diseases | | | x/— | x/— | x/— |
| | Allergies | | x/— | x/— | x/— | x/— | x/— |
| | Current Medications | Ocular | x/— | x/— | x/— | x/— | x/— |
| | | Systemic | | | x/— | x/— | x/— |
| | Medical History | Oculo-Systemic Diseases | | | | x/— | x/— |
| | | Medical History | | | | x/— | x/— |
| | | Surgical History | | | | x/— | x/— |
| | | Systems Review | | | | x/— | x/— |
| | Family History | Ocular Problems/Diseases | | | x/— | x/— | x/— |
| | | Ocular Surgeries | | | x/— | x/— | x/— |
| | | Oculo-Systemic Diseases | | | x/— | x/— | x/— |
| | Social History | | | | x/— | x/— | x/— |

The resulting final code for this patient would be a Final Code C (714) since the lowest component code of the three components (158, 234, and 320) was a Component Code C.

| | | | 99201 Problem Focused | 99202 Expanded Problem Focused | 99203 Detailed | 99204 Comprehensive | 99205 Comprehensive |
|---|---|---|---|---|---|---|---|
| | | Decision Matrix - New Patient | | | | | |
| EXAM | Vision | Uncorrected<br>With Correction<br>Pinhole | 1 entry in 1 of these sub-menus | 1 entry in 1 of these sub-menus | 1 entry in 1 of these sub-menus | 1 entry in 1 of these sub-menus | 1 entry in 1 of these sub-menus |
| | Refraction/<br>Keratometry<br>(refractions do not<br>drive the code) | Present Glasses<br>Present Contacts<br>Refraction - Dry<br>Retinoscopy<br>Refraction - Manifest<br>Refraction - Cycloplegic<br>Retinopathy<br>Refraction - Cycloplegic<br>Manifest<br>Keratometry | | | | | |
| | Tonometry/Pupil | Applanation<br>Schiotz<br>Pnuemotonometer<br>Tonopen<br>Handheld<br>Serial<br>Pupil | | 1 entry for both eyes in 1 of the Tonometry, Anterior or Posterior sub-menus | 2 or more entries for both eyes in 1 of the Tonometry, Anterior or Posterior sub-menus | 1 entry for both eyes in 1 of the Tonometry sub-menus | 1 entry for both eyes in 1 of the Tonometry sub-menus |
| | Anterior Exam | Motility<br>Lids<br>Conjunctiva<br>Cornea<br>Anterior Chamber<br>Iris<br>Lens<br>Gonioscopy | | | | 1 entry for both eyes in 1 of the Anterior Exam sub-menus | 1 entry for both eyes in 1 of the Anterior Exam sub-menus |
| | Posterior Exam | Vitreous<br>Optic Disc<br>Vessels<br>Macula<br>Fundus | | | | 1 entry for both eyes in 1 of the Posterior Exam sub-menus | 1 entry for both eyes in 1 of the Posterior Exam sub-menus |
| | Office Tests | (certain high risk tests will affect medical decision making) | | | | | |

40

| I. Number of Diagnoses or Management Options | | | | | | | | | | |
|---|---|---|---|---|---|---|---|---|---|---|
| | # Sentences in Present Illness | # of Allergies | # Allergies to Ocular Meds | # Current Ocular Meds | # Current Systemic Meds | # Family Ocular Diseases | Correctd Vision <20/60* | # Oculo-Systemic Conditions | # Ocular Diagnoses | Considered/ Ruled-Out Diagnoses |
| Straight Forward | 1 | 0 | 0 | 0 | 0 | 0 | 0 | 0 | 1 entry in 1 of these 2 | |
| Low Complexity | 1 | 1 | 0 | 0 | 0 | 0 | 0 | 0 | 2 entries in these 2 | |
| Moderate Complexity | 2 | 1 | 1 | 1 | 1 | 1 | 1 | | 2 entries in these 3 | |
| High Complexity | 3 | 2 | 1 | 2 | 1 | 1 | 1 | | 3 entries in these 3 | |

| | **** Total Diags | # Tests & Procedures Ordered | Meds Ordered, Cancelled, Continued | Call/ Return <1 month | Call/ Return <1 week | SUM | Code |
|---|---|---|---|---|---|---|---|
| Straight Forward | 1 | 0 | 0 | 0 | 0 | 2 | 99201 |
| Low Complexity | | | | | | | 99202 |
| Moderate | 2 | 0 | 1 | 1 | 0 | 6 | 99203 |

-continued

| I. Number of Diagnoses or Management Options | | | | | | | |
|---|---|---|---|---|---|---|---|
| Complexity High | 2 | 1 | 1 | 1 | 1 | 14 | 99204 |
| Complexity | 3 | 1 | 2 | 1 | 1 | 19 | 99205 |

*i.e. 20/61,62,63 etc.
****The Total Diagnoses column does not impact matrix.

| II. Amount &/or Complexity of Data Reviewed | | |
|---|---|---|
| | # of Data Reviewed | Code |
| Straight Forward | | 99201 |
| Low Complexity | 0 | 99202 |
| Moderate Complexity | 0 | 99203 |
| High Complexity | 1 | 99204 |
| Complexity | 2 | 99205 |

| III. Risk of Complications and/or Morbidity or Mortality | | | | | | |
|---|---|---|---|---|---|---|
| | # High Risk Medications | <age 5 or >age 65 | # High Risk Ofc Procs (Invasive) | # High Risk Diags | Intra-Ocular Pressure >20 | SUM | Code |
| Stright Forward | | | | | | | 99201 |
| Low Complexity | 0 | 0 | 0 | 0 | 0 | 0 | 99202 |
| Moderate Complexity | 0 | 0 | 0 | 0 | 1 | 1 | 99203 |
| High Complexity | 1 | 1 | 1 | 1 | 1 | 3** | 99204 |
| Complexity | 1 | 1 | 1 | 1 | 1 | 4** | 99205 |

**any 3 or 4

| | Present Illness | Tonometry | Anterior | Posterior | Prescribe/Cancel Medications | Tests/Procedures Ordered |
|---|---|---|---|---|---|---|
| 92002 | 1 | 1 | 1 or | 1 | 1 or | 1 |
| 92004 | 1 | 1 | 1 | 1 | 1 or | 1 |

| Decision Matrix - Established Patient | | | | | | |
|---|---|---|---|---|---|---|
| | | | 99212 Problem Focused | 99213 Expanded Problem Focused | 99214 Detailed | 99215 Comprehensive |
| HISTORY | Chief Complaint | | x | x | x | x |
| | Present Illness | Vision/Function Pain | Requires a minimum of 1–2 | 99213–99215 require a minimum of 3 statements in any of these sub-menus | | |

Decision Matrix - Established Patient

|  |  | 99212 Problem Focused | 99213 Expanded Problem Focused | 99214 Detailed | 99215 Comprehensive |
|---|---|---|---|---|---|
|  | Appearance | statements in any of these sub-menus | (Vision/Function, Pain, Appearance, Pre-Existing Condition, Trauma) | | |
|  | Pre-Existing Condition | | | | |
|  | Trauma | | | | |
| Severity of Presenting Prob | (does not drive E&M code) | 2 | 3 or 4 | 4 | 4 or 5 |
| Past Ocular History | Ocular Problems/Diseases | | | x/— | x/— |
|  | Ocular Surgeries | | | x/— | x/— |
|  | Oculo-Systemic Diseases | | | x/— | x/— |
| Allergies |  | x/— | x/— | x/— | x/— |
| Current Medications | Ocular | x/— | x/— | x/— | x/— |
|  | Systemic | | | x/— | x/— |
| Medical History | Oculo-Systemic Diseases | | | | x/— |
|  | Medical History | | | | x/— |
|  | Surgical History | | | | x/— |
|  | Systems Review | | | | x/— |
| Family History | Ocular Problems/Diseases | | | x/— | x/— |
|  | Ocular Surgeries | | | x/— | x/— |
|  | Oculo-Systemic Diseases | | | x/— | x/— |
| Social History |  | | | x/— | x/— |

NOTE:
99212–99215 require two of the three major components (history, exam, medical decision making).
99215 requires a Comprehensive History OR a Comprehensive Exam + High Complexity Decision Making.
The Established Patient codes (99212–99215) are different from the New Patient codes as follows: New Patient codes require three of the three major components; Established Patient codes require two of the three.

Decision Matrix - Established Patient

| EXAM | | | | | | |
|---|---|---|---|---|---|---|
| | Vision | Uncorrected | 1 entry in 1 of these sub-menus | 1 entry in 1 of these sub-menus | 1 entry in 1 of these sub-menus | 1 entry in 1 of these sub-menus |
| | | With Correction | | | | |
| | | Pinhole | | | | |
| | Refraction/Keratometry | Present Glasses | | | | |
| | | Present Contacts | | | | |
| | (refractions do not drive the code) | Refraction - Dry Retinoscopy | | | | |
| | | Refraction - Manifest | | | | |
| | | Refraction - Cycloplegic Retinopathy | | | | |
| | | Refraction - Cycloplegic Manifest | | | | |
| | | Keratometry | | | | |
| | Tonometry/Pupil | Applanation | | 1 entry for both eyes in 1 of the Tonometry, Anterior or Posterior sub-menus | 2 or more entries for both eyes in 1 of the Tonometry, Anterior or Posterior sub-menus | 1 entry for both eyes in 1 of the Tonometry sub-menus |
| | | Schiotz | | | | |
| | | Pnuemotonometer | | | | |
| | | Tonopen | | | | |
| | | Handheld | | | | |
| | | Serial | | | | |
| | | Pupil | | | | |
| | Anterior Exam | Motility | | | | 1 entry for both eyes in 1 of the Anterior Exam sub-menus |
| | | Lids | | | | |
| | | Conjunctiva | | | | |
| | | Cornea | | | | |
| | | Anterior Chamber | | | | |
| | | Iris | | | | |
| | | Lens | | | | |
| | | Gonioscopy | | | | |
| | Posterior Exam | Vitreous | | | | 1 entry for both eyes in 1 of the Posterior Exam sub-menus |
| | | Optic Disc | | | | |
| | | Vessels | | | | |
| | | Macula | | | | |
| | | Fundus | | | | |
| | Office Tests | (certain high risk tests will affect medical decision making) | | | | |

| I. Number of Diagnoses or Management Options | | | | | | | | | |
|---|---|---|---|---|---|---|---|---|---|
| | # Sentences in Present Illness | # of Allergies | # Allergies to Ocular Meds | # Current Ocular Meds | # Current Systemic Meds | # Family Ocular Diseases | Correctd Vision <20/60* | # Oculo-Systemic Conditions | # Ocular Diagnoses | Considered/ Ruled-Out Diagnoses |
| Straight Forward | 1 | 0 | 0 | 0 | 0 | 0 | 0 | 0 | 1 entry in 1 of these 2 | |
| Low Complexity | 1 | 1 | 0 | 0 | 0 | 0 | 0 | 0 | 2 entries in these 2 | |
| Moderate Complexity | 2 | 1 | 1 | 1 | 1 | 1 | 1 | | 2 entries in these 3 | |
| High Complexity | 3 | 2 | 1 | 2 | 1 | 1 | 1 | | 3 entries in these 3 | |

| | **** Total Diags | # Tests & Procedures Ordered | Meds Ordered, Cancelled, Continued | Call/ Return <1 month | Call/ Return <1 week | SUM | Code |
|---|---|---|---|---|---|---|---|
| Straight Forward | 1 | 0 | 0 | 0 | 0 | 2 | 99212 |
| Low Complexity | 2 | 0 | 1 | 1 | 0 | 6 | 99213 |
| Moderate Complexity | 2 | 1 | 1 | 1 | 1 | 14 | 99214 |
| High Complexity | 3 | 1 | 2 | 1 | 1 | 19 | 99215 |

*i.e. 20/61,62,63 etc.
****The Total Diagnoses column does not impact matrix.

| II. Amount &/or Complexity of Data Reviewed | | |
|---|---|---|
| | # of Data Reviewed | Code |
| Straight Forward | 0 | 99212 |
| Low Complexity | 0 | 99213 |
| Moderate Complexity | 1 | 99214 |
| High Complexity | 2 | 99215 |

| III. Risk of Complications and/or Morbidity or Mortality | | | | | | |
|---|---|---|---|---|---|---|
| | # High Risk Medications | <age 5 or >age 65 | # High Risk Ofc Procs (Invasive) | # High Risk Diags | Intra-Ocular Pressure >20 | SUM | Code |
| Stright Forward | 0 | 0 | 0 | 0 | 0 | 0 | 99212 |
| Low Complexity | 0 | 0 | 0 | 0 | 1 | 1 | 99213 |
| Moderate Complexity | 1 | 1 | 1 | 1 | 1 | 3** | 99214 |
| High Complexity | 1 | 1 | 1 | 1 | 1 | 4** | 99215 |

We claim:

1. A process for generation of Current Procedural Terminology ("CPT") codes comprising:

storing historical data in a memory;

comparing the historical data to a set of historical criteria to define a history code;

storing an examination data in a memory;

comparing the examination data to a set of examination criteria to define an examination code; storing medical decision making data in a memory;

comparing the medical decision making data to a set of medical decision making criteria to define a medical decision making code;

comparing the historical code, the examination code, and the medical decision making code to a set of final criteria to define a final CPT code; and displaying the final CPT code.

2. A process as in claim 1 wherein the display occurs on a CRT screen.

3. A process as in claim 1 wherein the display occurs on a printed page.

4. A process as in claim 1 wherein the CPT code is provided as an input variable to an accounting program.

5. A process for computing Current Procedural Terminology ("CPT") codes from documentation generated by a medical professional, said process comprising:

displaying a set of queries to the medical professional;

receiving input from the medical professional in response to said queries;

computing a component historical code based on said input and a set of stored historical criteria;

computing a component examination code based on said input and a set of stored examination criteria;

computing a component medical decision code based on said input and a set of stored medical decision criteria;

computing a final CPT code based on said historical code, said examination code and said medical decision code and a set of stored patient encounter criteria.

6. A process as in claim 5 wherein said computing a component historical code comprises weighting said historical code based on the number of times a historical criterion is met.

7. A process as in claim 5 wherein said computing a component examination code comprises weighting said examination code based on the number of times an examination criterion is met.

8. A process as in claim 5 wherein said computing a component medical decision code comprises weighting said medical decision code based on the number of times a medical decision criterion is met.

9. A process as in claim 5 wherein said medical decision code further comprises a number of diagnoses sub-component code, a risk of complications sub-component code and a complexity of data reviewed sub-component code.

10. A process as in claim 5 wherein said component historical code, said component examination code and said component medical decision code are computed each time input is received.

11. A process as in claim 5 wherein said queries further comprise textual phrases.

12. A process as in claim 5 wherein said queries are textual selections related to a medical treatment of a patient.

13. A process as in claim 5 wherein said queries are free of International Classification of Disease ("ICD") and Diagnosis Related Group ("DRG") code numbers.

14. A process as in claim 5 wherein said queries comprise diagnostic lists used in generating a patient's medical record.

15. A process as in claim 5 wherein said input is free of ICD and DRG code numbers.

* * * * *